(12) United States Patent
Choe et al.

(10) Patent No.: US 8,583,641 B2
(45) Date of Patent: *Nov. 12, 2013

(54) METHOD AND APPARATUS FOR CONSTRUCTING USER PROFILE USING CONTENT TAG, AND METHOD FOR CONTENT RECOMMENDATION USING THE CONSTRUCTED USER PROFILE

(75) Inventors: Yun-ju Choe, Suwon-si (KR); Cheol-ju Hwang, Yongin-si (KR); Min-ho Lee, Gwacheon-si (KR); Sung-hwan Choi, Seoul (KR); Won-dong Yun, Namyangju-si (KR); Soo-hong Park, Gwangju-si (KR); Jeong-rok Jang, Suwon-si (KR); Sang-wook Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,326

(22) Filed: Jun. 12, 2012

(65) Prior Publication Data

US 2012/0254170 A1    Oct. 4, 2012

Related U.S. Application Data

(63) Continuation of application No. 12/169,841, filed on Jul. 9, 2008, now Pat. No. 8,200,667.

(30) Foreign Application Priority Data

Aug. 30, 2007    (KR) .................. 10-2007-0087680

(51) Int. Cl.
    *G06F 17/30*    (2006.01)
(52) U.S. Cl.
    USPC ........... 707/733; 707/732; 707/734; 707/735; 707/721; 707/722

(58) Field of Classification Search
    USPC .................. 707/733, 732, 734, 722, 721
    See application file for complete search history.

(56) References Cited

U.S. PATENT DOCUMENTS 5,261,042 A    11/1993    Brandt
5,519,859 A    5/1996    Grace
(Continued)

FOREIGN PATENT DOCUMENTS

KR    2003-0003396    1/2003
KR    10-2005-0023583    3/2005
(Continued)

OTHER PUBLICATIONS

Office Action, mailed Oct. 27, 2010, in corresponding U.S. Appl. No. 12/169,841 (17 pp.).

(Continued)

*Primary Examiner* — Frantz Coby
(74) *Attorney, Agent, or Firm* — Staas & Halsey LLP (57)    ABSTRACT

A method of and apparatus for constructing a user profile using a content tag, a method of recommending digital content by using a user profile including a tag included in the digital content and a preference value for the tag. According to the methods and apparatus, a user profile is generated by using a content tag, and thus the taste of the user according to digital content consumption can be expressed in more varied ways. Also, by suggesting a method of generating a tag from web content, construction of a user profile for digital content having no tag is enabled. Furthermore, a tag extracted from digital content used by a user is included in a profile and it can be used for a variety of purposes, such as expansion of a comparison scope, use of preference keywords, providing of content links, and expansion of search scope.

19 Claims, 10 Drawing Sheets

(56) References Cited

U.S. PATENT DOCUMENTS

| | | | |
|---|---|---|---|
| 5,630,117 A | 5/1997 | Oren et al. | |
| 6,199,067 B1* | 3/2001 | Geller | 1/1 |
| 6,401,096 B1* | 6/2002 | Zellweger | 707/702 |
| 6,895,406 B2* | 5/2005 | Fables et al. | 707/765 |
| 7,403,968 B2* | 7/2008 | Lee et al. | 709/203 |
| 7,493,372 B2* | 2/2009 | Crabtree et al. | 709/217 |
| 7,593,921 B2* | 9/2009 | Goronzy et al. | 1/1 |
| 7,668,718 B2* | 2/2010 | Kahn et al. | 704/270 |
| 7,877,679 B2* | 1/2011 | Ozana | 715/221 |
| 7,970,762 B2* | 6/2011 | Goronzy et al. | 707/732 |
| 8,200,667 B2* | 6/2012 | Choe et al. | 707/733 |
| 2002/0083179 A1* | 6/2002 | Shaw et al. | 709/227 |
| 2005/0076365 A1 | 4/2005 | Popov et al. | |
| 2008/0270151 A1* | 10/2008 | Mahoney et al. | 705/1 |
| 2009/0012937 A1 | 1/2009 | Lee et al. | |
| 2010/0250341 A1* | 9/2010 | Hauser | 705/10 |

FOREIGN PATENT DOCUMENTS

| | | |
|---|---|---|
| KR | 2005-16454 | 6/2005 |
| KR | 10-2009-0003739 | 1/2009 |

OTHER PUBLICATIONS

Office Action, mailed May 23, 2011, in corresponding U.S. Appl. No. 12/169,841 (20 pp.).

Notice of Allowance, mailed Feb. 13, 2012, in corresponding U.S. Appl. No. 12/169,841 (6 pp.).

Office Action, mailed Apr. 10, 2012, in corresponding Korean Application No. 10-2007-0087680 (5 pp.).

* cited by examiner

FIG. 1 (PRIOR ART)

| USER A | | USER B | |
|---|---|---|---|
| CONTENT NAME | PREFERENCE VALUE | CONTENT NAME | PREFERENCE VALUE |
| SPIDER-MAN | GOOD (+5) | NOTTING HILL | GOOD (+7) |
| DA VINCI CODE | GOOD (+8) | CAST AWAY | GOOD (+5) |
| GLADIATOR | BAD (−8) | BIG | GOOD (+8) |
| FORREST GUMP | GOOD (+4) | TOY STORY | GOOD (+10) |
| TITANIC | BAD (−5) | | |

FIG. 2 (PRIOR ART)

| USER A | | |
|---|---|---|
| CONTENT NAME | METADATA | PREFERENCE VALUE |
| SPIDER-MAN | SF, TOBEY MAGUIRE | GOOD (+5) |
| DA VINCI CODE | MYSTERY, TOM HANKS | GOOD (+8) |
| GLADIATOR | DRAMA, RUSSEL CROWE | BAD (-8) |
| FORREST GUMP | DRAMA, TOM HANKS | GOOD (+4) |
| TITANIC | DRAMA, LEONARDO DICAPRIO | BAD (-5) |

| USER B | | |
|---|---|---|
| CONTENT NAME | METADATA | PREFERENCE VALUE |
| NOTTING HILL | ROMANCE, HUGH GRANT | GOOD (+7) |
| CAST AWAY | DRAMA, TOM HANKS | GOOD (+5) |
| BIG | DRAMA, TOM HANKS | GOOD (+8) |
| TOY STORY | ANIMATION, TOM HANKS | GOOD (+10) |

| CONTENT NAME | USER B | |
|---|---|---|
| | TAG | CONTENT RECOMMENDATION VALUE |
| BIG | DRAMA, TOM HANKS, TOP TEN HAPPY ENDING | +17=(+3)+(+9)+(+5)+(0) |
| CAST AWAY | DRAMA, TOM HANKS, DISASTER, FEDEX | +7=(+3)+(+9)+(-5)+(0) |
| NOTTING HILL | DRAMA, HUGH GRANT, HAPPY ENDING | +3=(+3)+(0)+(0) |

RECOMMENDATION RANKING
BIG > CAST AWAY > NOTTING HILL

FIG. 6

| CONTENT NAME | USER A | |
|---|---|---|
| | TAG | TIME STAMP |
| ~~SPIDER-MAN~~ | ~~SF, TOBEY MAGUIRE, DIDACTIC-DRAMA, TOP TEN RECOMMENDATION, SERIES~~ | ~~20070323~~ |
| GLADIATOR | DRAMA, RUSSEL CROWE, TRAGEDY, ROME | 20070420 |
| TITANIC | DRAMA, LEONARDO DICAPRIO, TRAGEDY, DISASTER, TRUE-LIFE | 20070424 |

METHOD AND APPARATUS FOR CONSTRUCTING USER PROFILE USING CONTENT TAG, AND METHOD FOR CONTENT RECOMMENDATION USING THE CONSTRUCTED USER PROFILE

CROSS-REFERENCE TO RELATED APPLICATION

This application is a continuation of U.S. application Ser. No. 12/169,841, filed Jul. 9, 2008, which claims the benefit of Korean Patent Application No. 2007-87680, filed in the Korean Intellectual Property Office on Aug. 30, 2007, the disclosures of which are incorporated herein by reference.

BACKGROUND OF THE INVENTION

1. Field of the Invention

Aspects of the present invention relate to a digital content recommendation system, and more particularly, to a method of and apparatus for constructing a user profile by using a content tag, and a method of recommending digital content by using the generated user profile.

2. Description of the Related Art

In a digital content recommendation system, by comparing profiles of users, a user can identify other user's tastes and recommend appropriate digital content. The user profiles indicate the preferences of the users for digital content, and the users represent their respective preferences according to a preference value of the digital content.

A user profile can be constructed with basic data of a user and digital content consumption information. The basic data includes age, sex, occupation, location, name, and so on. In the digital content consumption information, a preference value may be specified for each digital content file, or for metadata of a digital content file.

Figure 1:
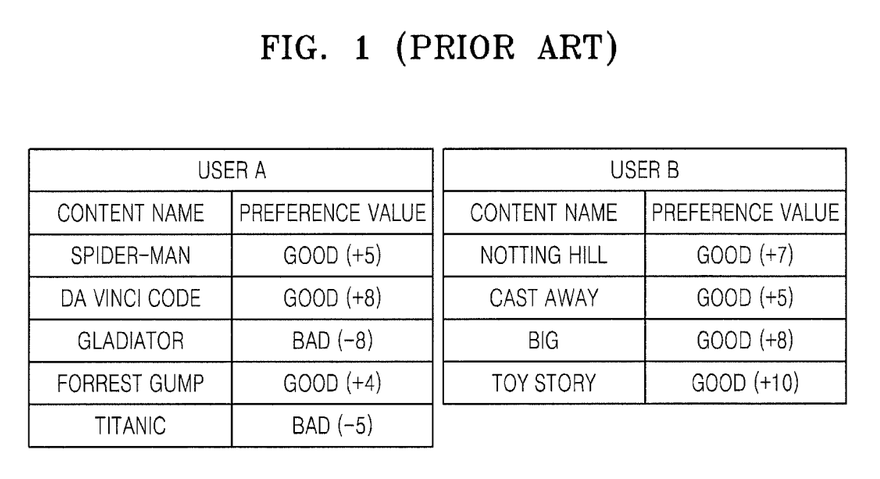
FIG. 1 is a diagram illustrating an example of a user profile constructed by specifying a preference value for digital content according to conventional technology.

FIG. 1 shows an example of a user profile constructed by specifying a preference value for digital content according to conventional technology. Digital content consumed by a user and a preference value according to the digital content consumption are specified. The preference value can be expressed by preference and non-preference values such as Good and Bad, or by numbers indicating the degrees of preference.

Figure 2:
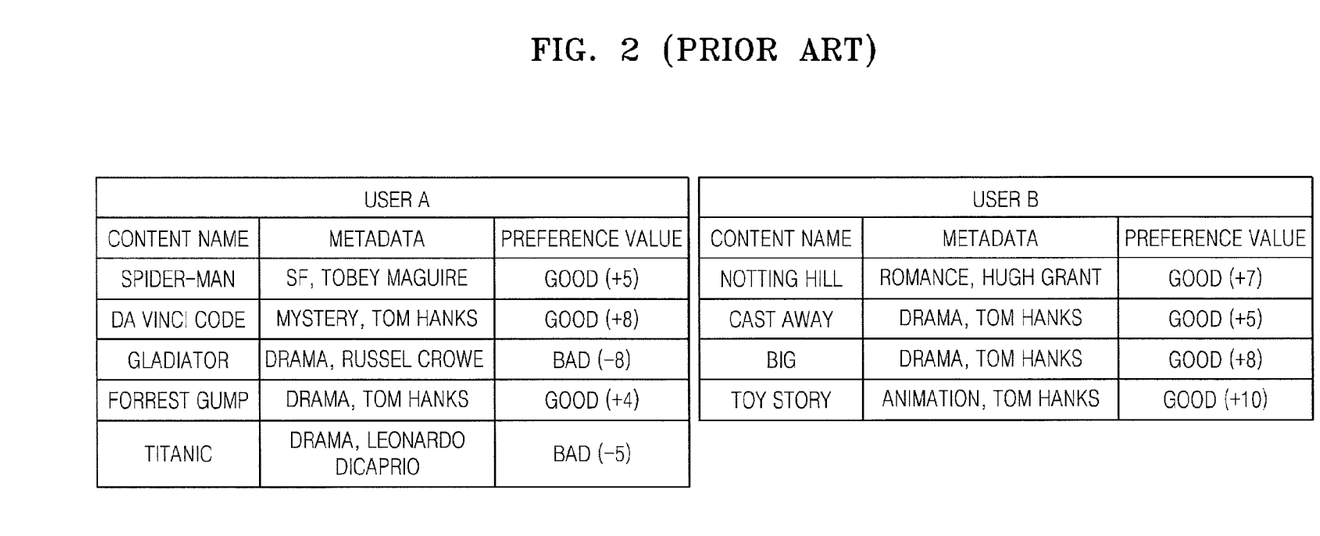
FIG. 2 is a diagram illustrating an example of a user profile constructed by specifying a preference value for metadata according to conventional technology.

FIG. 2 shows an example of a user profile constructed by specifying a preference value for metadata according to conventional technology. Metadata included in digital content and a preference value for the digital content are included in a user profile. The metadata includes items such as genres, actors, and titles. The items of the metadata are determined by a digital content producer. Accordingly, the metadata would have standardized items.

In a conventional digital content recommendation system, a user profile is generated as explained below, and by comparing generated user profiles, appropriate digital content is recommended to a user (who is referred to as an active user).

1. Generation of a user profile: If a user consumes digital content, feedback according to the digital content consumption is stored together with the name of the digital content as a profile.

2. Comparison of user profiles: The user profile is compared with a profile of another user. The preference of each user is represented by the digital content file consumed by the user and a preference value according to the digital content consumption.

For example, in the example shown in FIG. 1, there is no digital content file which user A and user B have in common, and user A and user B are classified as users having different preferences accordingly. It is impossible to recommend digital content between users having different preferences.

In the comparison method using profiles and metadata, only metadata items specified in advance by a content producer are compared. Accordingly, the method is characterized in that only standardized comparison is possible.

The conventional technology described above has various problems. If the amount of digital content files increases, the probability that digital content that is commonly used by multiple users does not exist increases. This is referred to as sparsity. Further, even when metadata is used, there is a limitation in that comparison is performed only within the scope of standardized metadata items. Due to this limitation, it is difficult to reflect a variety of preferences of users. Also, the metadata defined by the content producer is not expanded by other users, and it is difficult to reflect descriptive preferences of users.

SUMMARY OF THE INVENTION

Aspects of the present invention provide a system of recommending digital content in which the scope of comparison between users is expanded and comparison of more users by using user profiles constructed with content tags is enabled.

According to aspects of the present invention, a method of constructing a user profile by effectively extracting a tag from a digital content file a user used and by constructing a user profile by using the tag is provided, thereby enabling appropriate digital content to be more efficiently recommended for the user in an environment having many digital content files.

Aspects of the present invention provide a method of and apparatus for constructing a user profile using a content tag, a method of recommending digital content using a user profile including a tag included in the digital content and a preference value for the tag, and a computer readable recording medium having embodied thereon a computer program to execute such methods.

According to an aspect of the present invention, a method of constructing a user profile using a content tag is provided. The method includes receiving an input of a preference value for digital content; directly extracting a content tag from tag information added to the digital content; receiving an input for a tag specified by a user when the tag cannot be directly extracted from the digital content; generating a user profile using the extracted tag or the tag input by the user; and storing the user profile.

According to another aspect of the present invention, the receiving of the input of the tag specified by the user includes activating a tag specifying pointer on a user screen; displaying a tag generation request message to the user; receiving an input of a word as a user tag, the word being displayed at a position at which the tag specifying pointer is positioned on the user screen; displaying the input user tag on the user screen; and storing the user tag.

According to another aspect of the present invention, the generating of the user profile using the extracted tag or the tag input by the user includes adding the user preference value for the digital content to an existing user preference value for the tag.

According to another aspect of the present invention, an apparatus to construct a user profile using a content tag is provided. The apparatus includes a preference value extraction unit to receive an input of a preference value for digital content; a tag extraction unit to directly extract a content tag from tag information added to the digital content; a tag generation unit to receive an input for a tag specified by a user when the tag cannot be directly extracted from the digital content; a profile generation unit to construct a user profile using the extracted tag or the tag input by the user; and a profile storage unit to store the user profile.

According to another aspect of the present invention, the generation unit activates a tag specifying pointer on a user screen, displays a tag generation request message to the user, receive an input of a word as a user tag, the word being displayed at a position at which the tag specifying pointer is positioned on the user screen, displays the input user tag on the user screen, and stores the user tag.

According to another aspect of the present invention, the profile generation unit adds the user preference value for the digital content to an existing user preference value for the tag.

According to another aspect of the present invention, there a method of recommending digital content using a user profile including a tag included in the digital content and a preference value for each tag is provided. The method includes merging tag items included in the user profiles of two users desired to be compared to form one tag domain; assigning a preference value for each tag item included in the tag domain; comparing tags to which preference values are assigned for both the two users; calculating a recommendation value for the digital content by adding all the preference values for the tags; and recommending digital content files in order of decreasing recommendation values.

According to another aspect of the present invention, the comparing of the tags includes calculating a correlation between the two tags and according to the calculated value, determining similarity.

According to another aspect of the present invention, the comparing of the tags includes comparing synonym tags by regarding the synonym tags as identical tags.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A tag used in aspects of the present invention will be explained. The tag is description information on digital content, and describes the digital content in a more descriptive manner than a keyword containing only the theme of the digital content. Conventional metadata describes digital content in a preset metadata format. The tag can be regarded as more expandable digital content description in which both an author of the digital content and a user of the digital content can more freely describe additional details of the digital content. For example, the conventional metadata includes standardized description information of a song A, which is a digital content file, such as the genre, singer, production year, and producer.

The tag can include a variety of description information in addition to the information included in the metadata, such as that song A is a song appearing in an advertisement B, a song good for a rainy day, or a song popular among high school students. Tags are currently widely used in a variety of Internet content, for example, blogs, Internet communities, cafes, and user created content (UCC). According to aspects of the present invention, a user profile is constructed using this tag, thereby allowing the preference of a user on digital content to be identified.

Figure 3:
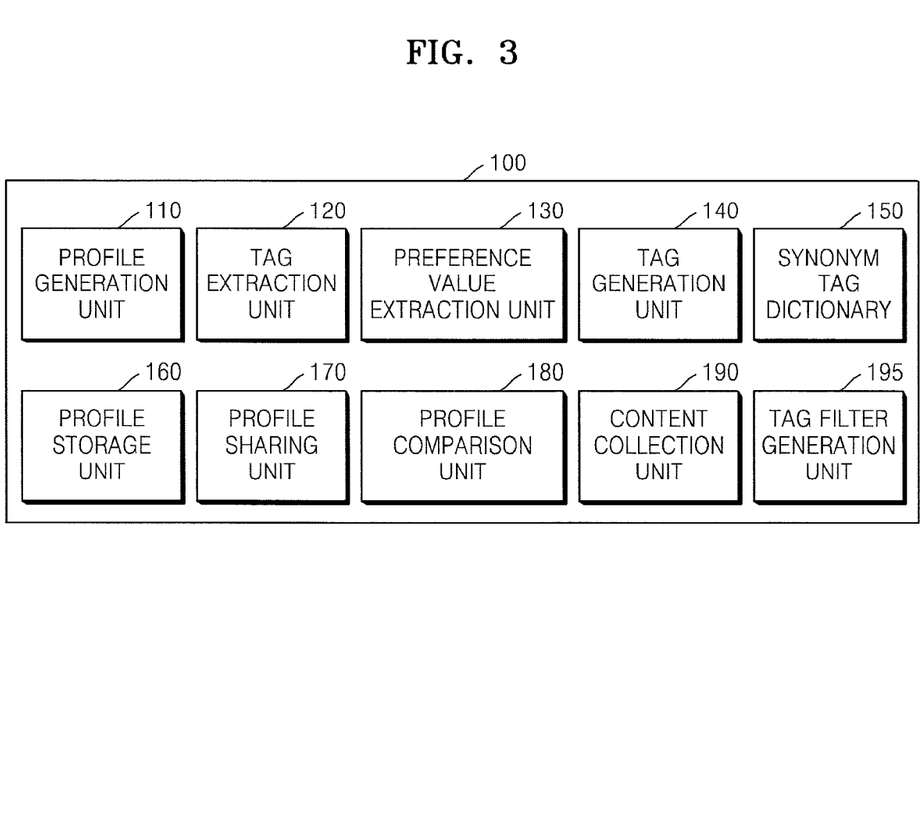
FIG. 3 is a block diagram illustrating a structure of a system for recommending digital content according to an embodiment of the present invention.

FIG. 3 shows a structure of a system 100 for recommending digital content according to an embodiment of the present invention. The content recommendation system 100 may include a profile generation unit 110, a tag extraction unit 120, a preference value extraction unit 130, a tag generation unit 140, a synonym tag dictionary 150, a profile storage unit 160, a profile sharing unit 170, a profile comparison unit 180, a content collection unit 190, and a tag filter generation unit 195. According to other aspects of the invention, the content recommendation system 100 may include additional and/or different units. Similarly, the functionality of two or more of the above units may be integrated into a single component.

The content recommendation system 100 may be a portable device or a fixed device such as a home personal computer (PC) of a user. The whole system may be a hardware apparatus, or a software program. When the system 100 is a software program, the system 100 may operate in a background mode as one application in order to analyze digital content consumption of a user, but the system 100 is not limited to this embodiment.

The profile generation unit 110 generates a user profile using digital content preference information of a user collected through the tag extraction unit 120, the preference value extraction unit 130, and the tag generation unit 140. The tag corresponding to each digital content file is ranked using a digital content preference value, and tags related to identical digital content have tag relations associated to each other.

The tag extraction unit 120 collects a tag embedded in a digital content file if the user consumes the digital content file.

The tag extraction unit 120 extracts information on which digital content is used and additional information included in the digital content (the tag and other information), and transfers the information to the profile generation unit 110.

The preference value extraction unit 130 identifies the preference value of the digital content that the user uses. For identification of the preference value, a technique of extracting a content preference value specified by the user on the Internet, a technique of letting the user input the preference value through an inquiry window, or a technique of identifying the intrinsic preference value of the user by analyzing the content use behavior of the user may be used.

The tag generation unit 140 generates a tag if a tag is not included in a digital content file used by the user. A variety of techniques can be used to generate the tag, including asking the user to do tagging (an operation for generating a tag), extracting a tag from the contents of digital content or additional information, and/or finding tagging information of an identical digital content file on the Internet.

The synonym tag dictionary 150 plays a role of a synonym dictionary when tags having similar meanings are classified. For example, 'TV' and 'television' may be included in an identical tag group and tags referred to as 'TV' and 'television' can be classified as similar tags.

Figure 6:
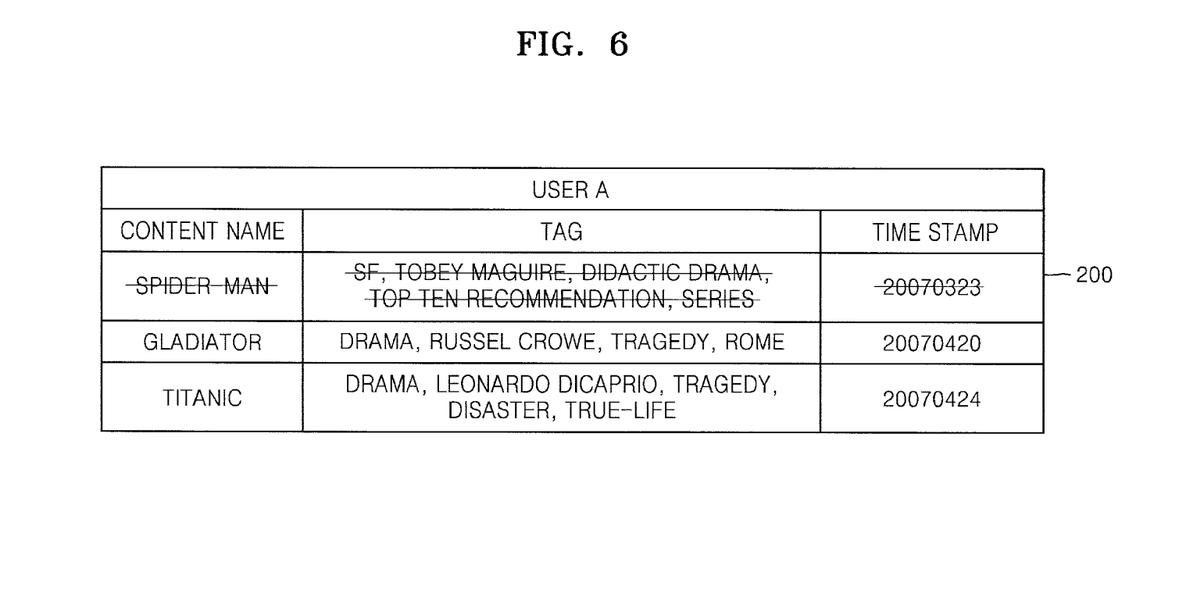
FIG. 6 is a diagram illustrating an example of updating a user profile according to an embodiment of the present invention.

The profile storage unit 160 stores the user profile generated in the profile generation unit 110. The user profile is updated when digital content use information of the user changes, or after a predetermined period has elapsed. Also, by setting a time window, a profile value can be automatically deleted after the passage of a predetermined time. FIG. 6 shows an example of updating a user profile according to an embodiment of the present invention in which an expired profile value 200 of the oldest digital content 'spider-man' is deleted.

Returning to FIG. 3, the profile sharing unit 170 allows sharing of the user profile stored in the profile storage unit 160 with a server or other users through a network. The profile sharing unit 170 allows sharing of the profile using a variety of network apparatuses, such as a wireless local area network (WLAN), Ethernet, high speed downlink packet access (HSDPA), and wireless broadband Internet (WiBro). The profile can be shared through a single or a plurality of network apparatuses.

The profile comparison unit 180 compares the profile of the current user with the profile of another user. In this case, by referring to the synonym tag dictionary 150, tags having similar meanings are treated as identical tags. The content collection unit 190 identifies several tags corresponding to high preference values as popular tags, from among tags included in the profile of the user, and collects digital content files related to these popular tags. The tag filter generation unit 195 sets a tag as desired or undesired by the user and uses the tag as a filter when digital content is recommended or collected.

Figure 8:
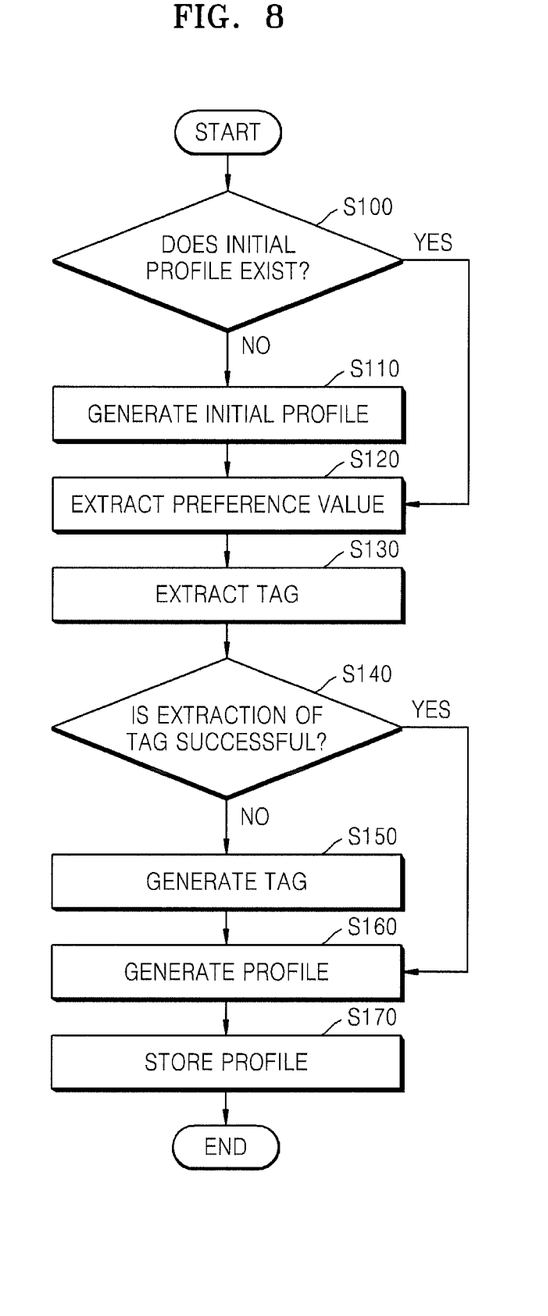
FIG. 8 is a flowchart illustrating a process of constructing a profile according to an embodiment of the present invention.

FIG. 8 is a flowchart of a process of constructing a profile according to an embodiment of the present invention. If a user uses digital content, information on whether or not the user prefers the digital content is stored as a user profile.

(1) Generation of an Initial Profile

The profile generation unit 110 determines whether an initial profile exists in operation S100. If the profile of the user does not exist, the profile generation unit 110 generates an initial profile in operation S110. The initial profile includes the name of the user, ID, and basic information (age, occupation, sex, location, etc.). According to other aspects of the present invention, the initial profile may include additional information about the user.

(2) Extraction of a Preference Value

The preference value extraction unit 130 extracts a preference value in operation S120. The preference value extraction unit 130 stores an evaluation value of each digital content file that the user used, together with the name of the digital content file as a pair. Each digital content file can be classified with the title or unique ID of the digital content. The evaluation value is a value indicating the degree of preference of the user on the digital content, and can be expressed as preference or non-preference, or as a number indicating the degree of preference or non-preference. However, the present invention is not limited to the ways of determining the name of the digital content and evaluation values. If the user does not specify a preference value for a digital content file that the user used, a preference value can be assigned in a variety of ways, including analysis of digital content consumption behavior of the user, and prediction through comparison with other digital content files. Since these ways of assigning preference values are well-known in the field of the art to which the present invention belongs, explanation on the methods will be omitted here.

(3) Extraction and Generation of a Tag

A content tag is a core keyword on a digital content file, and can be regarded as a representative attribute of the digital content file. The tag of each digital content file may be extracted using the tag extraction unit 120 or may be generated in the tag generation unit 140. Theoretically, there is no limit to the number of tags that can be assigned to each digital content file, but there may be a restriction according to an environment in which the tag is implemented. For example, in an apparatus having a small memory space, the number of tags may be limited.

The tag extraction unit 120 extracts a tag from a digital content file if the tag exists in the digital content in operation S130. The tag extraction unit 120 may be broken down into a part to extract a tag from web content, and a part to extract a tag from a local multimedia file. Where a tag is extracted from web content, the extraction is implemented by training a standard tag specifying rule such as rel-"tag" of Microformats or a tag specifying rule of each web portal. Where a tag is extracted from a local multimedia file, a parser of each multimedia file is used to parse the file, and then, a tag is formed as extractable metadata. According to other aspects of the invention, other ways to extract the tag may be used. If a tag cannot be extracted in the tag extraction unit 120 in operation S140, or if the user inputs a tag, the tag generation unit 140 generates a tag in operation S150.

Figure 7:
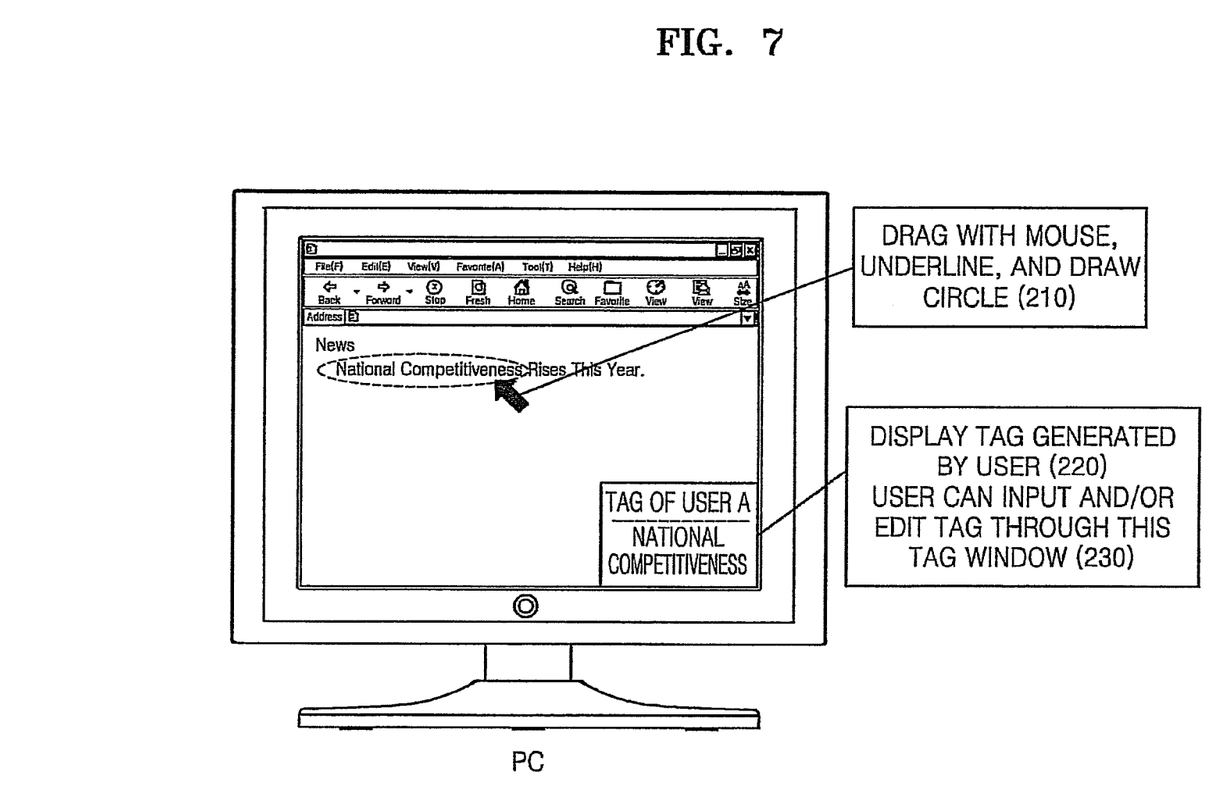
FIG. 7 is a diagram illustrating an example of generating a tag according to an embodiment of the present invention.
Figure 9:
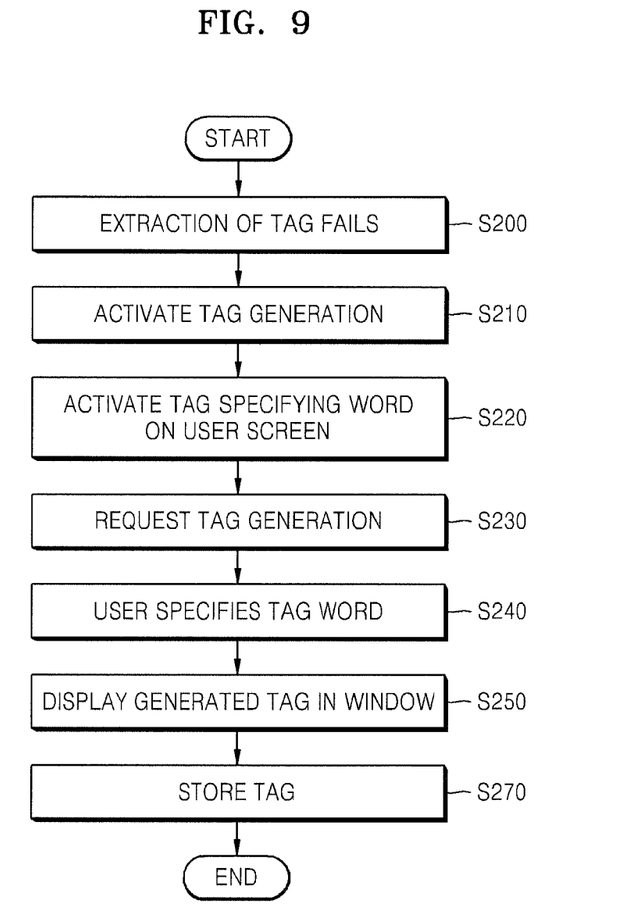
FIG. 9 is a flowchart illustrating a process of generating a tag according to an embodiment of the present invention.

FIG. 9 is a flowchart of a process of generating a tag according to an embodiment of the present invention. If the tag extraction unit 120 fails to extract a tag in operation S200, the tag generation unit 140 activates tag generation in operation S210, activates a tag specifying pointer on a user screen in operation S220, and then requests the user to generate a tag in operation S230. For the tag generation, a tag can be automatically generated by a method of inputting text through an edit-box (230) or by indicating a word desired by the user using a mouse with functions such as dragging, underlining or circling (210) as shown in FIG. 7.

The process by which the user specifies a tag word using the mouse will now be explained in more detail. The user specifies a word that the user desires to be generated as a tag using a pointer generated by a profile generation program or a mouse, and by double-clicking, dragging, underlining or circling in operation S240. A tag generated using the word is displayed in a window in operation S250. The generated tag is stored in operation S270 and may be used to generate a profile. The user may generate the tag in other ways as well, according to other aspects of the present invention.

When a sentence is dragged, a word can be extracted from the sentence using morpheme analysis in natural language processing. In addition to the case when extraction of a tag has failed, when the user wants to generate a tag, the tag generation unit 140 can additionally generate a tag. The generated tag is displayed to the user through a window 220 shown in FIG. 7, so that the user can edit the generated tag. A tag value generated by the tag generation unit 140 is transferred to the profile generation unit 110, and is used when the user profile is generated in operation S160. The generated profile is stored in the profile storage unit 160 in operation S170.

(4) Update of a User Profile

A user profile is updated with a digital content file which the user used and the preference value for the digital content file (evaluation value).

(4-1) Preference Value

A preference value assigned by the user or by estimation is an evaluation value of the user on each digital content file. Based on this value, a preference value of each tag is assigned. A tag derived from each digital content file inherits a preference value for the digital content file without change. Identical tags for many digital content files can merge into a single tag, and in this case, the preference value of each tag is added up.

Figure 4:
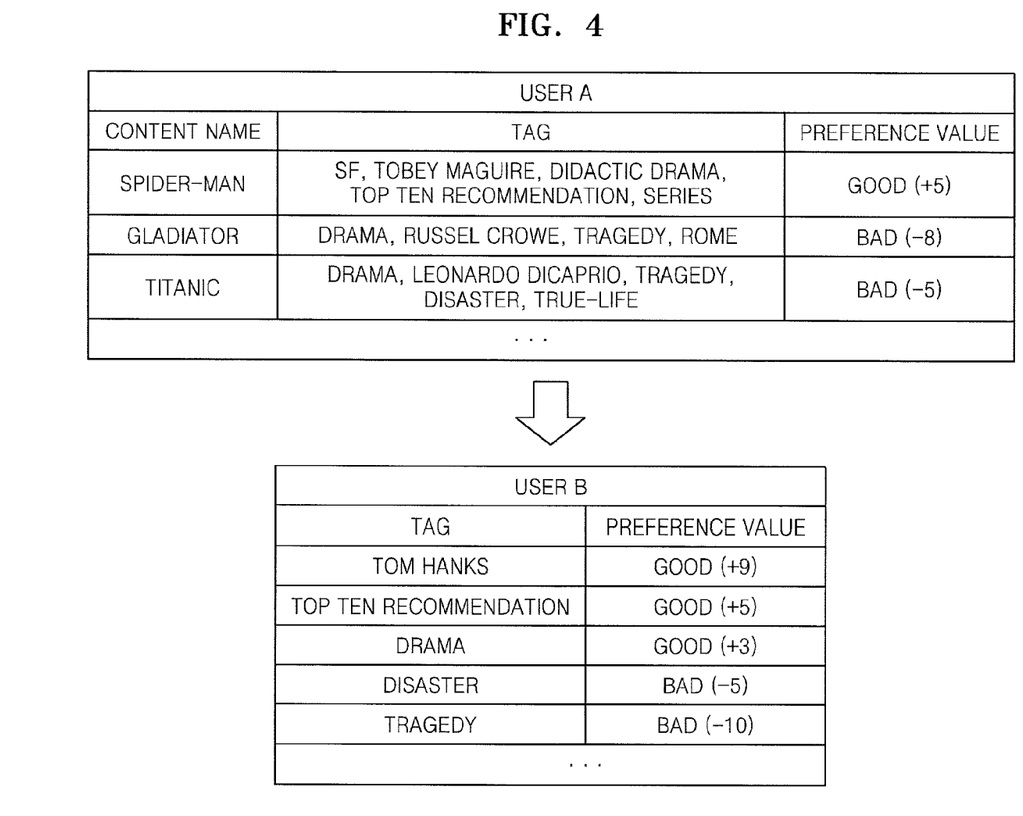
FIG. 4 is a diagram illustrating an example of a user profile constructed using a tag according to an embodiment of the present invention.

FIG. 4 shows an example of a user profile constructed using a tag according to an embodiment of the present invention. In order to calculate a preference value for a tag named 'tragedy', the following processes are performed. First, the tag 'tragedy' is included in Gladiator and Titanic. Accordingly, −8 which is the preference value for Gladiator is assigned to 'tragedy'. Then, −5 which is the preference value for Titanic is added to −8 which is the existing user preference value. Accordingly, the preference value for 'tragedy' becomes −13.

As mentioned above, the preference value may be a number in a predetermined range, and may also indicate preference and/or non-preference. In the latter case, in order to calculate a preference value for the whole tag, preference may be expressed as +1 and non-preference may be expressed as −1, thereby enabling calculation of the preference value for the tag by adding up the preference values. By comparing the number of preferences and/or non-preferences of each tag, if the number of preferences is greater than the number of non-preferences, the tag can be determined as a preference, and if the number of non-preferences is greater, the tag can be determined as a non-preference. For example, when the number of preferences is 10 and the number of non-preferences is 5 in relation to a drama tag, the drama tag can be determined as a preference.

(5) Comparison of Similarity

By comparing the profile of a first user with the profile of another user, the first user can identify a second user who has a preference similar to that of the first user, and can get recommendations from the second user. The comparison of the profiles is performed by comparing tag items of the users. Since tags are used, the comparison of preferences is enabled even when a digital content file which both of the users consumed does not exist.

Figure 10:
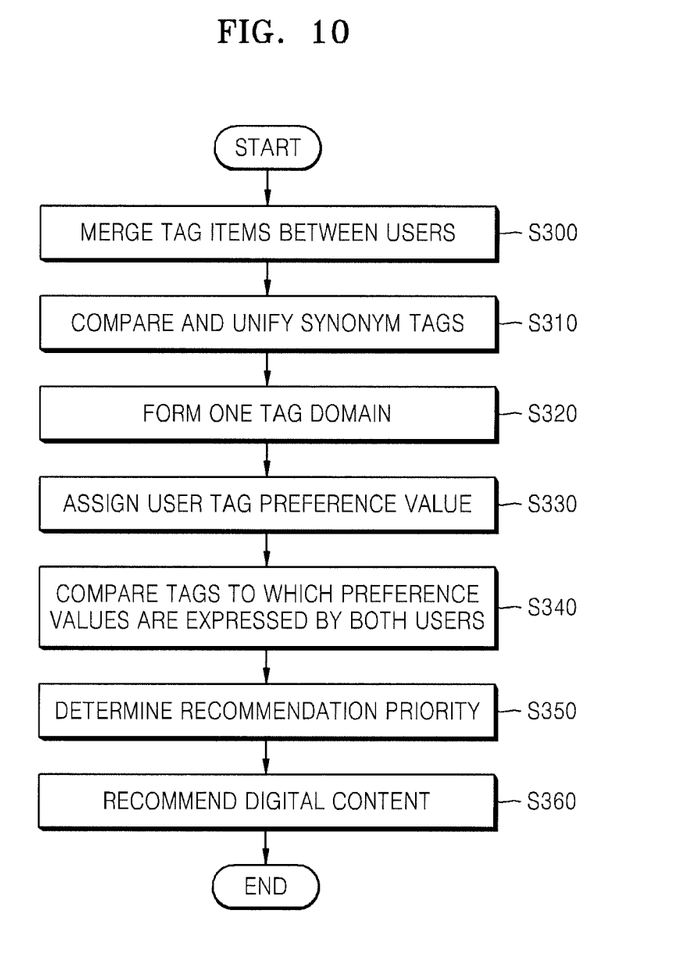
FIG. 10 is a flowchart illustrating a process of comparing user profiles according to an embodiment of the present invention.

FIG. 10 is a flowchart of a process of comparing user profiles according to an embodiment of the present invention. By merging the tags of two users in operation S300, one tag domain is formed in operation S320. Tags in the generated tag domain are arranged in alphabetical order or reverse alphabetical order. In one tag domain, each user assigns a preference value to each of his or her tags in operation S330, and compares the preference values in operation S340. In the comparison domain, each user does not express a preference value for a tag which the user does not have. Comparison of similarity of each tag can be performed by a variety of similarity comparison algorithms. For example, by calculating a correlation between two tags, similarity can be determined based on the calculated value.

Figure 5:
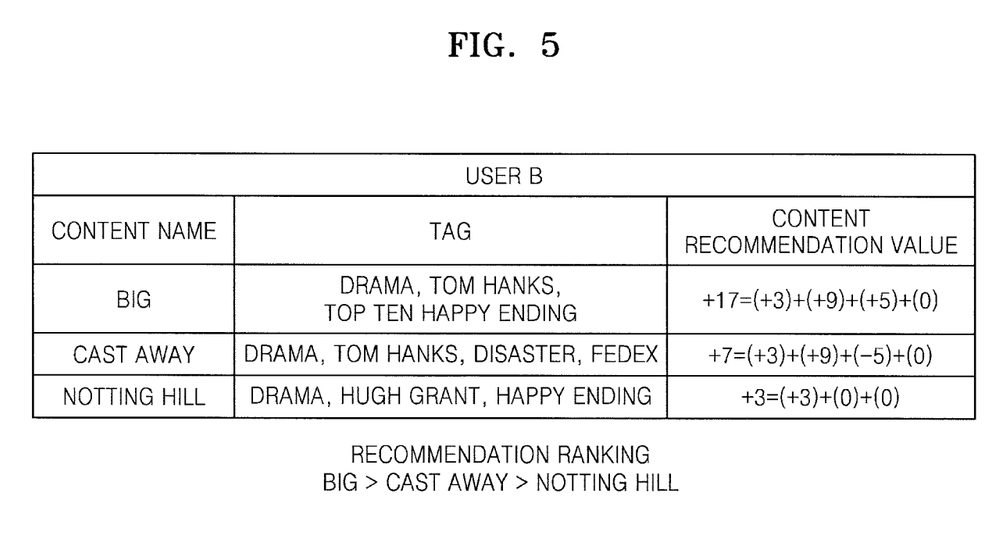
FIG. 5 is a diagram illustrating an example of recommending digital content using a user profile according to an embodiment of the present invention.

If a tag item having similar preferences is found through the comparison, recommendation priorities are determined in order of decreasing content recommendation value from among digital content files having the tag item. In the example shown in FIG. 5, the content recommendation values are +17 for Big, +7 for Cast Away, and +3 for Notting Hill. In this case, the recommendation priorities are in order of Big, Cast Away, and Notting Hill.

In relation to a tag for which non-preferences are commonly expressed for the comparison objects, non-recommendation may also be offered. For example, if two users express non-preferences for a 'tragedy' tag, a user who recommends digital content may recommend that the digital content corresponding to the tag should not be watched. By using the synonym tag dictionary 150, synonym tags can be regarded as identical tags and then compared in operation S310.

(6) Recommendation of Digital Content

In operation S360, a digital content file is recommended through similarity comparison with other users.

While the conventional profile is focused on input information of a user (age, sex, occupation, interest, etc.), or simple recording of content preference values (preference value according to the kind of digital content), aspects of the present invention use content tags and therefore the preference of a user with respect to consumed digital content can be expressed in more varied ways. The process of generating a tag from web content is suggested, thereby enabling a user profile to be constructed even for a digital content file having no tag.

A tag extracted from digital content used by a user is included in a profile and therefore can be used for a variety of purposes, such as expansion of a comparison scope, use of preference keywords, providing of content links, and expansion of search scope.

1) Expansion of a Comparison Scope

As the number of digital content files existing in an environment increases, the probability that a user for whom recommendation is performed (an active user) will meet users who consumed the same digital content as that of the active user decreases. As a result, a problem occurs in that a group of users that have digital content able to be compared decreases in an environment where a higher number of digital content files exist. In the case where only new digital content for which evaluation has not been performed is used, a problem that it is difficult to meet a user who has consumed identical digital content may occur. When standardized metadata is used, comparison is performed within the scope of the metadata, and therefore it is difficult to identify more varied preferences of a user. However, in a profile using a tag, various digital content descriptions are included in addition to the content description included in the conventional metadata, and thereby wider and more varied preferences of a user can be identified. For example, in the case of a profile using conventional metadata, only whether or not a user A likes a drama can be determined; however, in the case of a profile using a tag suggested in aspects of the present invention, whether or not the user A likes dramas with a tragic ending or whether or not the user A dislikes old-fashioned dramas can be expressed, thereby expanding the scope of comparison compared to the conventional metadata.

2) Generation of Preference Keywords

A user preference keyword can be generated using tags of digital content consumed by a user. This has an advantage of immediately reflecting the changing taste of a user, compared to the conventional method where a user preference keyword together with a preference keyword value are directly input by a user. For example, after setting a preference keyword as 'World Cup', if a user does not change the keyword, the preference keyword of the user remains as 'World Cup' even after a World Cup event is over. According to aspects of the present invention, a tag value is updated with a preference keyword immediately according to a user's consumption of digital content. This preference keyword can be used to filter reference data or collected data when information is collected from the outside.

3) Link of Digital Content

A variety of links between digital content files are provided. Instead of simply classifying digital content files according to genres or categories, this enables digital content files to be grouped in a scope desired by a user, thereby providing a variety of links between digital content files. By describing consumed digital content with a tag, and thereby including the information in a profile, related data links that are provided by conventional web content are made to be available also in a user's own digital content files. In other words, by classifying digital content files having tags identical or similar to a tag included in a predetermined digital content file as similar digital content files, links between digital content files can be provided.

4) Expansion of Search

With a profile using a tag, desired digital content can be found even without having specific information on the digital content when a user searches for the digital content. For example, when a user A searches for songs which the user A wants to joyfully listen to with friends on a picnic day, a recommendation of songs is enabled by using various tag information, such as songs good for a picnic, pleasant songs, and songs good for listening to together. When digital content is explained with standardized metadata such as genre, singer, and title according to the conventional method, songs are recommended in a limited scope, for example, 'dance' as a genre, and 'picnic' as a title. Compared to the conventional method, the profile using a tag can recommend a greater variety of digital content files and at the same time can appropriately respond to the explanatory need descriptive searches of a user.

Aspects of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CDs, DVDs, Blu-ray discs, HD-DVDs, magnetic tapes, floppy disks, optical data storage devices, etc.

According to aspects of the present invention, a user profile is generated using a content tag, and thus the taste of the user according to digital content consumption can be expressed in more varied ways. Also, by suggesting a method of generating a tag from web content, construction of a user profile for digital content having no tag is enabled. Furthermore, a tag extracted from digital content used by a user is included in a profile and therefore can be used for a variety of purposes, such as expansion of a comparison scope, use of preference keywords, providing of content links, and expansion of search scope.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of constructing a user profile using a content tag, the method comprising:
   directly extracting a content tag from tag information added to a digital content;
   receiving an input for a tag specified by the user of the digital content when the tag cannot be directly extracted from the digital content;
   generating a user profile of the user of the digital content using the extracted tag or the tag input by the user of the digital content; and
   storing the profile of the user of the digital content,
   wherein a preference value for the extracted tag or the tag input by the user of the digital content is generated by adding up the preference values of digital contents including the tag.

2. The method of claim 1, wherein the receiving of the input for the tag specified by the user of the digital content comprises:
   activating a tag specifying pointer on a screen for the user of the digital content;
   displaying a tag generation request message to the user of the digital content;
   receiving an input of a word as a tag provided by the user of the digital content, the word being displayed at a position at which the tag specifying pointer is positioned on the user screen;
   displaying the input tag provided by the user of the digital content on the user screen; and
   storing the tag of the user of the digital content.

3. The method of claim 1, wherein the generating of the user profile using the extracted tag or the tag input by the user of the digital content comprises combining the preference value for the digital content used by the user of the digital content with an existing preference value for the tag for the user of the digital content.

4. A hardware device to construct a user profile using a content tag, the device comprising:
   a tag extraction unit to directly extract a content tag from tag information added to a digital content;
   a tag generation unit to receive an input for a tag specified by the user of the digital content when the tag cannot be directly extracted from the digital content;
   a profile generation processor to construct a user profile of the user of the digital content using the extracted tag or the tag input by the user of the digital content; and
   a profile storage unit to store the profile of the user of the digital content,
   wherein a preference value for the extracted tag or the tag input by the user of the digital content is generated by adding up the preference values of digital contents including the tag.

5. The hardware device of claim 4, wherein the tag generation unit activates a tag specifying pointer on a screen for the user of the digital content, displays a tag generation request message to the user of the digital content, receives an input of a word as a tag provided by the user of the digital content, the word being displayed at a position at which the tag specifying pointer is positioned on the user screen, displays the input tag provided by the user of the digital content on the user screen, and stores the tag of the user of the digital content.

6. The hardware device of claim 4, wherein the profile generation processor combines the preference value for the digital content used by the user of the digital content with an existing preference value for the tag for the user of the digital content.

7. A method of recommending digital content to a first user of digital content desiring to be compared to a second user of digital content, the first and second users not authors of the digital content, the method comprising:
  merging a plurality of tag items included in a profile of the first user of digital content with a plurality of tag items in a profile of the second user of digital content to form a singular tag domain;
  extracting a preference value related to the digital content of a t least one of the first user and the second user based on a digital content preference of the respective first user and the second user to similar digital content;
  comparing tags to which preference values are assigned for both users of the digital content;
  calculating a recommendation value for each of a digital content files by adding all the preference values for the tags that have been compared; and
  recommending the plurality of digital content files to the first user of digital content in order of decreasing recommendation value.

8. The method of claim 7, wherein the comparing of the tags comprises calculating a correlation between the two tags and determining similarity according to the calculated value.

9. The method of claim 7, wherein the comparing of the tags comprises comparing synonym tags by regarding the synonym tags as identical tags.

10. A non-transitory computer readable recording medium having embodied thereon a computer program to execute a method of constructing a user profile using a content tag, wherein the method comprises:
  directly extracting a content tag from tag information added to the digital content;
  generating a user profile of the user of the digital content using the extracted tag or the tag input by the user of the digital content; and
  storing the profile of the user of the digital content,
  wherein a preference value for the extracted tag or the tag input by the user of the digital content is generated by adding up the preference values of digital contents including the tag.

11. A non-transitory computer readable recording medium having embodied thereon a computer program to execute a method of recommending a digital content to a first user of the digital content desiring to be compared to a second user of the digital content, the first and second users not authors of the digital content, wherein the method comprises:
  merging a plurality of tag items included in a profile of the first user of the digital content with a plurality of tag items included in a profile of the second user of the digital content to form a one tag domain;
  extracting a preference value related to the digital content of at least one of the first user and the second user based on a digital content preference of the respective first user and the second user to similar digital content;
  comparing tags to which preference values are assigned for both users of the digital content;
  calculating a recommendation value for each of a plurality of digital content files by adding all the preference values for the tags that have been compared; and
  recommending digital content files to the first user of the digital content in order of decreasing recommendation value.

12. A method of recommending digital content to a first user of digital content based on profiles of a first user of the digital content and a second user of the digital content, the first and second users not authors of the digital content, the method comprising:
  generating an initial profile of a first user of the digital content;
  extracting a preference value related to the digital content used by the first user of the digital content, wherein the extracting the preference value includes extracting a preference value related to the digital content based on a digital content preference of the first user to similar digital content;
  extracting or generating at least one tag related to the digital content;
  updating a profile of the first user of the digital content based on the initial profile, the digital content, and the preference values of each of the at least one tag;
  comparing the user profile of the first user of the digital content with a user profile of a second user of digital content; and
  recommending digital content to the first user of the digital content based on the comparing.

13. The method of claim 12, wherein the extracting or generating of the at least one tag comprises extracting the at least one tag from web content.

14. The method of claim 12, wherein the extracting of the preference value comprises generating the preference value based on the user's of the digital content consumption of digital content.

15. The method of claim 12, wherein the comparing of the user profile comprises:
  creating a tag domain by merging the at least one tag in the user of the digital content profile and at least one second tag in the second user of the digital content profile;
  creating a comparison domain based on the tag domain, the comparison domain including at least one tag in the user of the digital content profile that corresponds to at least one tag in the second user of the digital content profile;
  generating a recommendation priority order for the user of the digital content by comparing the at least one extracted tag from the digital content with at least one corresponding tag in the comparison domain.

16. The method of claim 15, wherein the generating of the recommendation priority order comprises summing preference values corresponding to the at least one corresponding tag in the comparison domain.

17. The hardware device of claim 4, wherein the tag extraction unit comprises:
  a web content extraction unit to extract the tag from web content; and
  a local content extraction unit to extract the tag from digital content stored locally.

18. A method of generating a profile of a first user of digital content to recommend digital content to a second user of digital content, the method comprising:
  extracting a tag corresponding to digital content used by the first user of the digital content;
  extracting a preference value related to the digital content of the user based on a digital content preference of the first user to similar digital content; and
  generating a profile of the first user of the digital content to recommend digital content to a second user of the digital content based on the extracted tag.

19. A method of constructing a profile of a user of a digital content that is not authored by the user, the method comprising:

directly extracting by a computer a first tag from tag information associated with the digital content;
receiving an input for a second tag specified by the user of the digital content when the first tag cannot be directly extracted by the computer from the digital content;
generating a user profile of the user of the digital content using the first tag extracted by the computer or the second tag input by the user of the digital content; and
storing the profile of the user of the digital content,
wherein a preference value for the extracted tag or the tag input by the user of the digital content is generated by adding up the preference values of digital contents including the tag.

* * * * *

UNITED STATES PATENT AND TRADEMARK OFFICE
CERTIFICATE OF CORRECTION

| | |
|---|---|
| PATENT NO. | : 8,583,641 B2 |
| APPLICATION NO. | : 13/494326 |
| DATED | : November 12, 2013 |
| INVENTOR(S) | : Choe et al. |

Page 1 of 1

It is certified that error appears in the above-identified patent and that said Letters Patent is hereby corrected as shown below:

In the Claims
In Column 10, Line 12, In Claim 1, delete "by the user" and insert -- by a user --, therefor.
In Column 10, Line 15, In Claim 1, delete "generating a user" and insert -- generating the user --, therefor.
In Column 10, Line 48, In Claim 4, delete "by the user" and insert -- by a user --, therefor.
In Column 11, Line 11, In Claim 7, delete "of digital" and insert -- of a digital --, therefor.
In Column 11, Line 12, In Claim 7, delete "of digital" and insert -- of the digital --, therefor.
In Column 11, Line 15, In Claim 7, delete "a t least" and insert -- at least --, therefor.
In Column 11, Line 20, In Claim 7, delete "a digital" and insert -- a plurality of digital --, therefor.
In Column 11, Line 24, In Claim 7, delete "of digital" and insert -- of the digital --, therefor.
In Column 11, Line 28, In Claim 8, delete "determining similarity" and insert -- determining a similarity --, therefor.
In Column 11, Line 37, In Claim 10, delete "to the digital" and insert -- to a digital --, therefor.
In Column 12, Line 2, In Claim 12, delete "of digital" and insert -- of a digital --, therefor.
In Column 12, Line 20, In Claim 12, delete "of digital" and insert -- of the digital --, therefor.
In Column 12, Line 22, In Claim 12, delete "recommending digital" and insert -- recommending a digital --, therefor.
In Column 12, Line 60, In Claim 18, delete "the user" and insert -- the first user --, therefor.

Signed and Sealed this
Twenty-fifth Day of March, 2014

Michelle K. Lee
*Deputy Director of the United States Patent and Trademark Office*